(12) United States Patent
Arakawa

(10) Patent No.: US 11,167,703 B2
(45) Date of Patent: Nov. 9, 2021

(54) ROUTE RESTRICTION MEMBER FOR A WIRE HARNESS FOR RESTRICTING A ROUTE OF AN ELECTRICAL WIRE, AND A WIRE HARNESS THEREOF

(71) Applicant: SUMITOMO WIRING SYSTEMS, LTD., Yokkaichi (JP)

(72) Inventor: Hiroyuki Arakawa, Yokkaichi (JP)

(73) Assignee: SUMITOMO WIRING SYSTEMS, LTD., Mie (JP)

(*) Notice: Subject to any disclaimer, the term of this patent is extended or adjusted under 35 U.S.C. 154(b) by 0 days.

(21) Appl. No.: 16/979,789

(22) PCT Filed: Mar. 7, 2019

(86) PCT No.: PCT/JP2019/008983
§ 371 (c)(1),
(2) Date: Sep. 10, 2020

(87) PCT Pub. No.: WO2019/181521
PCT Pub. Date: Sep. 26, 2019

(65) Prior Publication Data
US 2021/0039570 A1    Feb. 11, 2021

(30) Foreign Application Priority Data
Mar. 20, 2018  (JP) .............................. JP2018-052657

(51) Int. Cl.
*B60R 16/02* (2006.01)
*H02G 3/04* (2006.01)
(52) U.S. Cl.
CPC ........ *B60R 16/0215* (2013.01); *H02G 3/0406* (2013.01); *H02G 3/0462* (2013.01)

(58) Field of Classification Search
CPC ...... H02G 3/30; H02G 3/0406; H02G 3/0462; F16B 2/20; F16B 2/08; B60R 16/0215
(Continued)

(56) References Cited

U.S. PATENT DOCUMENTS 3,968,322 A * 7/1976 Taylor .................... H02G 3/045
174/72 A
7,100,641 B2 * 9/2006 Tyrer ...................... H02G 9/065
138/110

(Continued)

FOREIGN PATENT DOCUMENTS

JP   H04-012745 Y2   3/1992
JP   H07-007025 U    1/1995
(Continued)

OTHER PUBLICATIONS

Apr. 23, 2019 International Search Report issued in International Patent Application No. PCT/JP2019/008983.

*Primary Examiner* — Timothy J Thompson
*Assistant Examiner* — Michael F McAllister
(74) *Attorney, Agent, or Firm* — Oliff PLC

(57) ABSTRACT

A route restriction member for a wire harness for accommodating an electrical wire and restricting a route of the electrical wire, the route restriction member including: a tube in which the electrical wire is accommodated, the tube includes: a first member made of metal, and a second member made of metal that is abutted against the first member to form the tube; and a fastening band that fastens an outer periphery of the tube, wherein abutments of the first member and the second member that are abutted against each other engage the fastening band with a protrusion/recess relationship therebetween.

3 Claims, 3 Drawing Sheets

(58) Field of Classification Search
USPC .......................................... 174/72 A
See application file for complete search history.

(56) References Cited

U.S. PATENT DOCUMENTS

| | | | |
|---|---|---|---|
| 7,168,452 B2* | 1/2007 | Sasaki | F16L 53/35 |
| | | | 138/110 |
| 8,833,706 B2* | 9/2014 | Elsmore | F16L 3/1075 |
| | | | 248/74.4 |
| 2006/0231151 A1 | 10/2006 | Sasaki et al. | |
| 2012/0132465 A1* | 5/2012 | Mabuchi | B60R 16/0215 |
| | | | 174/72 A |
| 2017/0246997 A1* | 8/2017 | Suzuki | H01R 43/24 |
| 2018/0145430 A1* | 5/2018 | Yanai | H01B 7/02 |

FOREIGN PATENT DOCUMENTS

| | | |
|---|---|---|
| JP | 2012-228085 A | 11/2012 |
| JP | 2016-046943 A | 4/2016 |

\* cited by examiner

ROUTE RESTRICTION MEMBER FOR A WIRE HARNESS FOR RESTRICTING A ROUTE OF AN ELECTRICAL WIRE, AND A WIRE HARNESS THEREOF

BACKGROUND

The present disclosure relates to a route restriction member for a wire harness, and a wire harness.

Conventionally, a vehicular wire harness is provided, for example, with a protector for routing electrical wires along a predetermined routing path (see JP 2016-46943A, for example). The protector of JP 2016-46943A has a protector body with a recess that is capable of accommodating electrical wires and a lid member for closing an opening of the recess. The protector body and the lid member are both made of a synthetic resin material. The route of the electrical wires accommodated in the protector is restricted by using the protector, which is shaped to correspond to a predetermined routing path.

SUMMARY

Note that the protector of the wire harness described in JP 2016-46943A has a shape that corresponds to a predetermined routing path. Therefore, it is necessary to use a protector having a different shape for each routing path. However, as the protector body and the lid member are formed by injection-molding a synthetic resin material, a problem arises in which the same number of injection molds as that of the types of protectors are needed.

An exemplary aspect of the disclosure provides a route restriction member for a wire harness and a wire harness capable of restricting a routing path with a simple configuration.

A route restriction member according to an exemplary aspect for a wire harness for accommodating an electrical wire and restricting a route of the electrical wire, the route restriction member including: a tube in which the electrical wire is accommodated, the tube includes: a first member made of metal, and a second member made of metal that is abutted against the first member to form the tube; and a fastening band that fastens an outer periphery of the tube, wherein abutments of the first member and the second member that are abutted against each other engage the fastening band with a protrusion/recess relationship therebetween.

According to this configuration, the route of the electrical wire is restricted by interposing and accommodating the electrical wire between the first and second members made of metal. Accordingly, the first and second members can be bent to easily form a shape that corresponds to a predetermined routing path.

According to the foregoing configuration, the longitudinal and radial displacement of the first member and the second member relative to each other can be restricted as the abutments of the first member and the second member engage the fastening band with the protrusion/recess relationship therebetween. Because of this, no restricting portions for restricting the displacement of the first member and the second member relative to each other need to be provided on the inner peripheries of the first member and the second member. As a result, the restriction of the internal space of the first member and the second member that would be caused by such restricting portions can be reduced, thus limiting the upsizing of the first member and the second member for accommodating an electrical wire.

Moreover, as the recesses or protrusions are provided in the abutments of the first member and the second member, the first member and the second member can be easily aligned with each other during abutment, by aligning the recesses or the protrusions of the abutments with each other.

Therefore, it is possible to restrict the routing path using the simple configuration.

In the foregoing route restriction member for a wire harness, the first member and the second member may also be, for example, a pair of half bodies.

In the foregoing route restriction member for a wire harness, it is preferable that a pair of fitting recesses are provided in the abutments of the pair of half bodies, the pair of fitting recesses being adjacent to each other in a circumferential direction of the pair of half bodies and forming a fitting hole, and that a fitting protrusion that fits in the fitting hole is provided on an inner peripheral surface of the fastening band.

According to this configuration, the fitting recesses can be easily formed by cutting the abutments of the pair of half bodies. Therefore, the pair of half bodies can be formed easily.

In the foregoing route restriction member for a wire harness, preferably, a clip is erected on an outer peripheral surface of the fastening band.

According to this configuration, a wire harness can be attached to an object of attachment by fitting the clip to the object of attachment.

A wire harness according to an exemplary aspect comprises an electrical wire and any one of the foregoing route restriction members for a wire harness.

This configuration can provide effects similar to the effects of any one of the foregoing route restriction members for a wire harness.

Disclosure

According to the present disclosure, it is possible to restrict a routing path using a simple configuration.

DETAILED DESCRIPTION OF EMBODIMENTS

One embodiment will be described hereinafter with reference to FIGS. 1-4.

Figure 1:
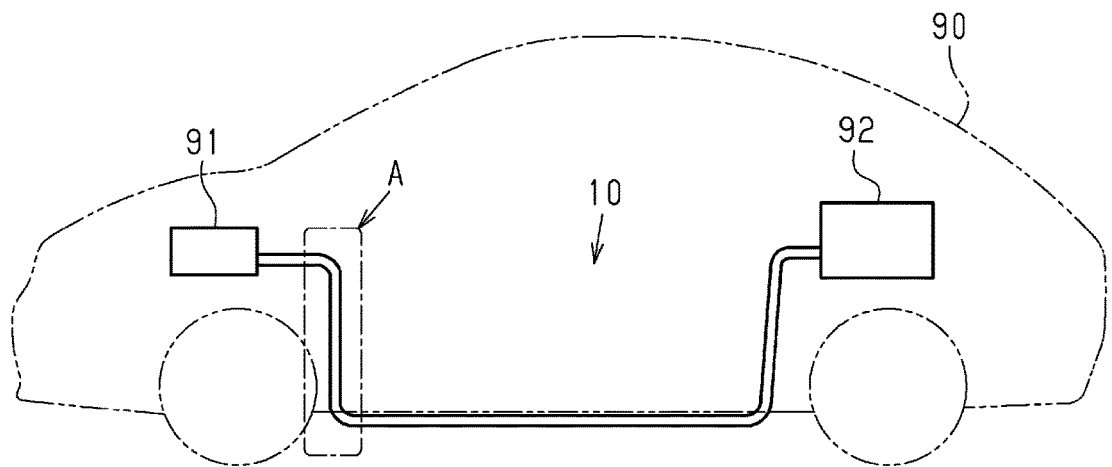
FIG. 1 is a side view of a route restriction member for a wire harness and a wire harness of one embodiment, showing the wire harness routed in a vehicle.

As shown in FIG. 1, a wire harness 10 is routed along a path including the underside of the floor of a vehicle 90, such as a hybrid car or an electric vehicle, and electrically connects a motor 91 disposed in the front of the vehicle 90 and an inverter 92 disposed in the rear of the vehicle 90.

Figure 2:
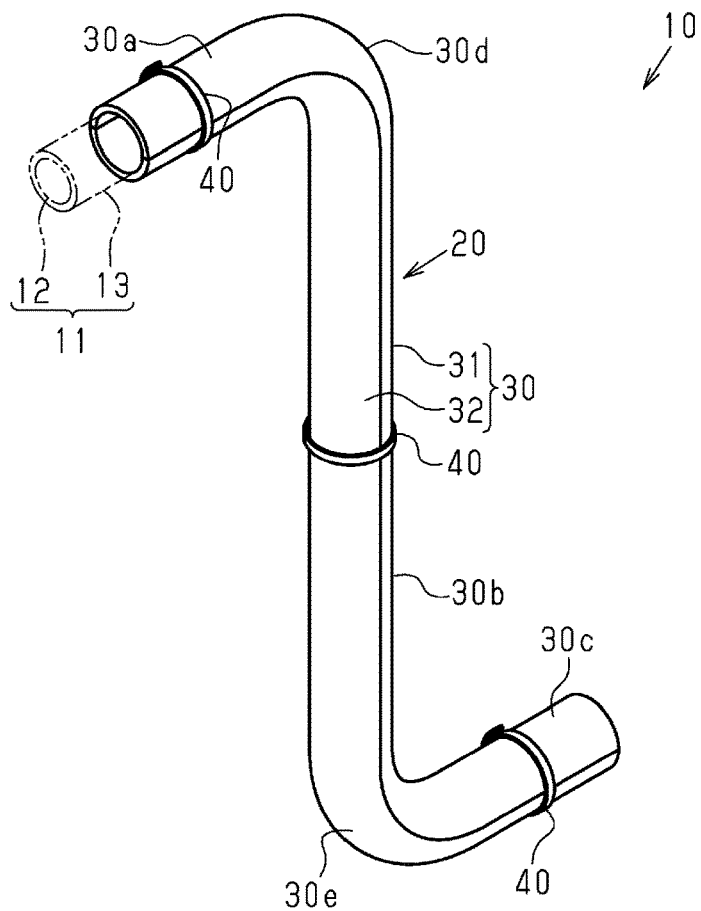
FIG. 2 is a perspective view enlarging the region A of FIG. 1.

As shown in FIG. 2, the wire harness 10 includes an electrical wire 11 and a route restriction member 20 that accommodates the electrical wire 11 and restricts the route of the electrical wire 11.

The electric wire 11 is provided with a core wire 12 and an insulating coating 13 that covers the outer periphery of the core wire 12. The core wire 12 may be a stranded wire formed, for example, by stranding a plurality of metallic element wires made of a copper alloy. The insulating coating 13 is an insulator, such as polyvinyl chloride (PVC).

The route restriction member 20 includes a pair of half bodies (a first half body 31 and a second half body 32) made of metal in the shape of a half cylinder that form a cylindrical tubular member 30 (tube) by being abutted against each other, and a plurality (three in this embodiment) of fastening bands 40 made of a synthetic resin that fasten the outer peripheries of the first half body 31 and the second half body 32.

Note that although the tubular member 30 is formed of a pair of half bodies in this embodiment, the tubular member 30 may also be formed, for example, by abutting a first member against a second member having a greater circumference than that of the first member. In other words, it will suffice if the tubular member 30 is composed of a plurality of members. Furthermore, the tubular member 30 may be formed by additionally interposing a third member between the first member and the second member. In the embodiment below, the cylindrical tubular member 30 will be described as being formed by a pair of half bodies made of metal (a first half body 31 and a second half body 32).

The following describes the tubular member 30 and the fastening bands 40 in detail. Note that the lengthwise direction and the circumferential direction of the tubular member 30 (the first half body 31 and the second half body 32) will be referred to simply as the lengthwise direction and the circumferential direction hereinafter.

Tubular Member 30

As shown in FIG. 2, the tubular member 30 is provided with three straight portions spaced apart at longitudinal intervals (a first straight portion 30a, a second straight portion 30b, and a third straight portion 30c). A first bend portion 30d is provided between the first straight portion 30a and the second straight portion 30b. A second bend portion 30e is provided between the second straight portion 30b and the third straight portion 30c.

Figure 3A:
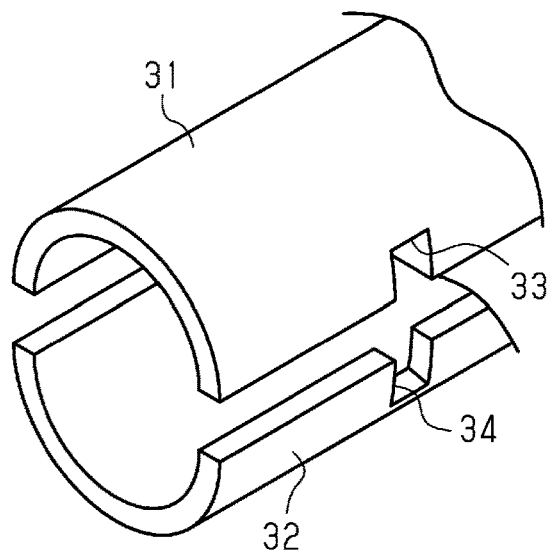
FIG. 3(a) is a perspective view of the route restriction member of the embodiment, showing a first half body and a second half body spaced apart from each other.
Figure 3B:
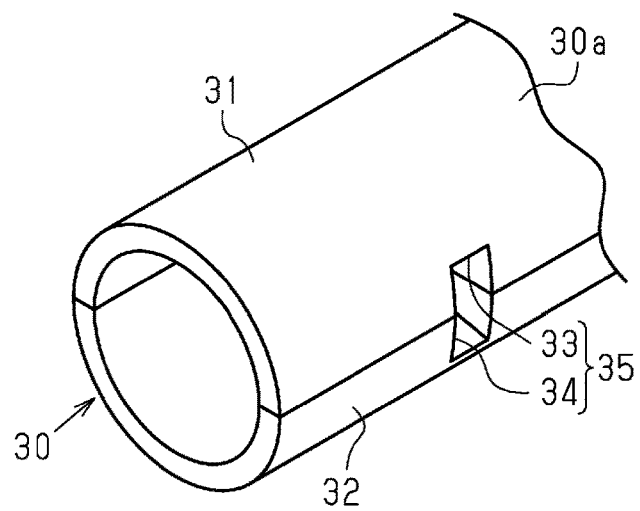
FIG. 3(b) is a perspective view showing the first half body and the second half body abutted against each other.
Figure 3C:
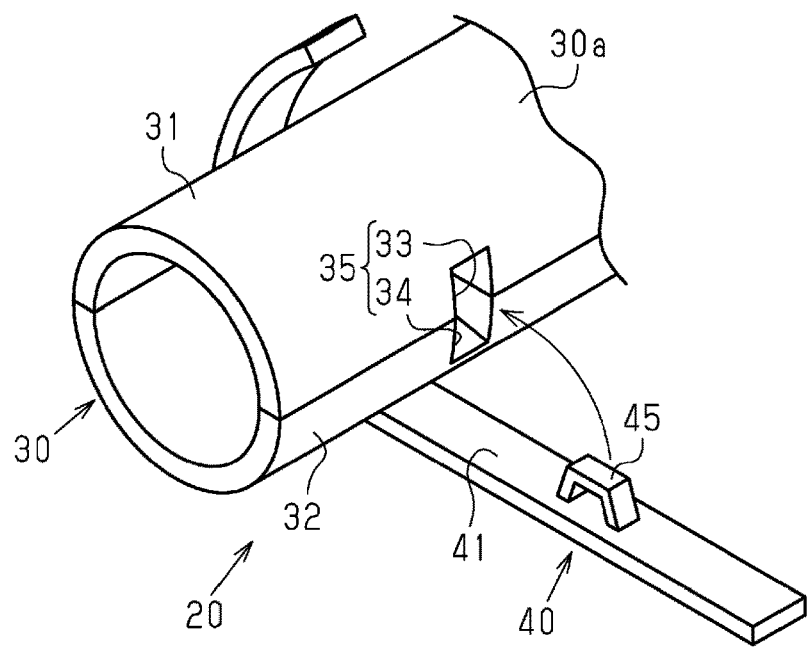
FIG. 3(c) is a perspective view showing a fastening band in the process of being mounted around the outer periphery of the first half body and the second half body.

As shown in FIGS. 3(a)-(c), a pair of fitting recesses (a first fitting recess 33 and a second fitting recess 34) adjacent to each other in the circumferential direction is provided in the abutment portions (abutments) of the first half body 31 and the second half body 32 in the first straight portion 30a. The first fitting recess 33 and the second fitting recess 34 have a rectangular shape as seen in a side view.

As shown in FIGS. 3(b) and (c), a fitting hole 35 having a rectangular shape as seen in a side view is formed by the first fitting recess 33 and the second fitting recess 34.

Fastening Band 40

Figure 4A:
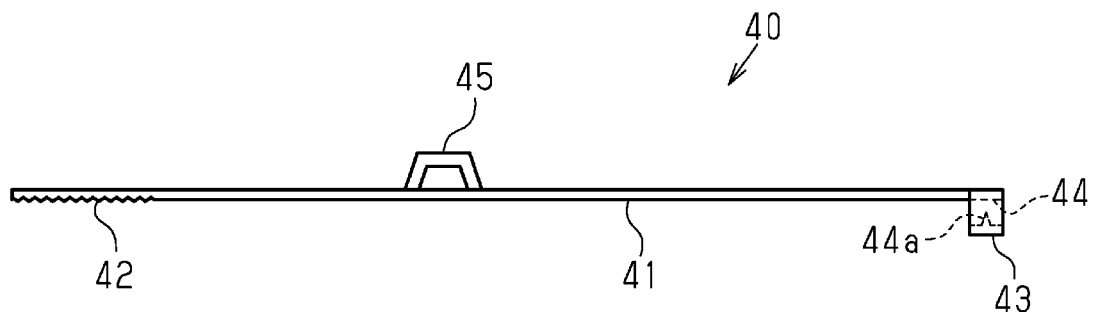
FIG. 4(a) shows a side view of the fastening band of the embodiment, showing it in a straightened state.

As shown in FIGS. 4(a) and (b), the fastening band 40 is a so-called binding band that includes a band body 41 extending in the circumferential direction and an engaging portion 43 that is provided on the proximal end of the band body 41 and capable of engaging with the band body 41 and adjusting the degree of fastening by the band body 41. In addition, a fitting protrusion 45 that fits in the fitting hole 35 of the tubular member 30 is provided on the inner peripheral surface of the band body 41.

As shown in FIG. 4(a), a plurality of engaging grooves 42 (so-called serrations) that extend in the widthwise direction of the band body 41 are provided on the outer peripheral surface of the top end of the band body 41 at predetermined intervals in the longitudinal direction of the band body 41.

The engaging portion 43 includes an insertion hole 44 through which the band body 41 can be inserted. Provided on the inner surface of the insertion hole 44 is an engaging pawl 44a that engages the engaging grooves 42 of the band body 41. The degree of fastening by the band body 41 on the tubular member 30 (the first half body 31 and the second half body 32) can be adjusted according to the degree of insertion of the band body 41 with respect to the engaging portion 43.

Figure 4B:
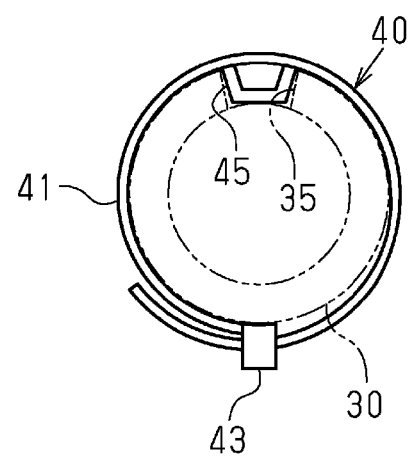
FIG. 4(b) shows a side view showing it curled in a circular state.

As shown in FIG. 4(b), the fitting protrusion 45 of the fastening band 40 is fitted in the fitting hole 35 of the tubular member 30.

Note that in the present embodiment, one fitting hole 35 (omitted from the view) is provided in each of the straight portions 30a, 30b, and 30c of the tubular member 30.

Additionally, as shown in FIG. 2, the part of the outer periphery that corresponds to each of the fitting holes 35 is fastened by a fastening band 40.

The effects of the present embodiment will now be described.

(1) The route restriction member 20 includes a pair of half bodies 31 and 32 made of metal in the shape of a half cylinder that form a cylindrical shape by being abutted against each other, and fastening bands 40 that fasten the outer peripheries of the pair of half bodies 31 and 32. Provided in the abutment portions of the pair of half bodies 31 and 32 is a pair of fitting recesses 33 and 34 adjacent to each other in the circumferential direction of the pair of half bodies 31 and 32 to form a fitting hole 35. A fitting protrusion 45 that fits in the fitting hole 35 is provided on the inner peripheral surface of the band body 40.

According to this configuration, the route of an electrical wire 11 is restricted by interposing and accommodating the electrical wire 11 between the pair of half bodies 31 and 32 made of metal. Accordingly, the half bodies 31 and 32 can be bent to easily form a shape that corresponds to a predetermined routing path.

According to the foregoing configuration, the longitudinal and radial displacement of the half bodies 31 and 32 relative to each other can be restricted as the pair of fitting recesses 33 and 34 (the fitting hole 35) provided in the abutment portions of the pair of half bodies 31 and 32 engage the fitting protrusion 45 on the fastening band 40 by means of the protrusion/recess relationship therebetween. Because of this, no restricting portions for restricting the displacement of the half bodies 31 and 32 relative to each other need to be provided on the inner peripheries of the half bodies. As a result, the restriction of the internal space of the pair of half bodies 31 and 32 that would be caused by such restricting portions can be reduced, thus limiting the upsizing of the half bodies 31 and 32 for accommodating an electrical wire 11.

Moreover, as the fitting recesses 33 and 34 are provided in the abutment portions of the half boy pair 31 and 32, the half bodies 31 and 32 can be easily aligned with each other during abutment, by aligning the fitting recesses 33 and 34 with each other.

Therefore, it is possible to restrict the routing path using the simple configuration.

Furthermore, according to the foregoing configuration, the fitting recesses 33 and 34 can be easily formed by cutting the abutment portions of the pair of half bodies 31 and 32. Therefore, the pair of half bodies 31 and 32 can be formed easily.

(2) The wire harness 10 includes an electrical wire 11 with a core wire 12 having an insulating coat thereon and a route restriction member 20.

This configuration can provide effects similar to the effects (1) above.

This embodiment may be practiced with the modifications below. This embodiment and the modifications below may be practiced in combination to the extent that they are technically compatible.

Figure 5:
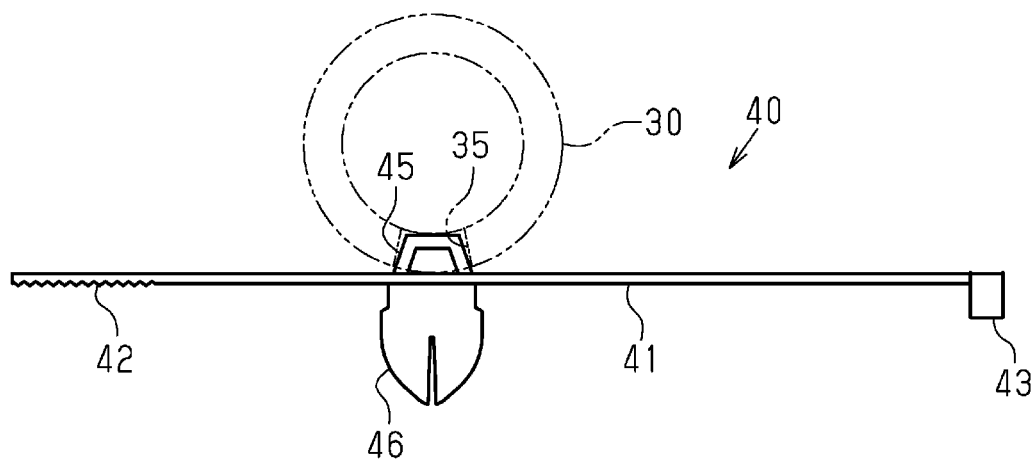
FIG. 5 is a side view showing a variation of the fastening band.

- As shown in FIG. 5, a clip portion 46 (clip) may be erected on the outer peripheral surface of the fastening band 40 to attach the fastening band 40 to an object of attachment, such as a vehicle. In this case, the wire harness can be attached to the object of attachment by assembling the clip portion 46 to the object of attachment.
- In the foregoing embodiment, while the fastening band 40 provided with the engaging portion 43 capable of adjusting the degree of fastening by the band body 41 is described, the fastening band may not include such an adjustment function.
- The shape of the first fitting recess 33 and the second fitting recess 34 is not limited to a rectangular shape as seen in a side view; it may, for example, be a semicircular shape as seen from the side. In this case, as the fitting hole has a circular shape as seen from the side, it suffices to provide on the inner peripheral surface a cylindrical fitting protrusion that fits in the fitting hole.
- The first fitting recess 33 and the second fitting recess 34 are not limited to those that penetrate the half bodies 31 and 32 in the direction of their depth; they may, for example, be recessed in the outer peripheral surfaces of the half bodies 31 and 32.
- A pair of fitting protrusions may be provided on the abutment portions of the first half body 31 and the second half body 32 so as to be adjacent to each other in the circumferential direction and project from the outer periphery, and fitting holes or fitting recesses may be provided on the fastening band that fit on the foregoing fitting protrusions.
- The fastening band may be formed of a metallic material.

It will be obvious to those skilled in the art that the present disclosure can be implemented in other specific embodiments without departing from the technical concept thereof. For example, some of the components described in the embodiments (or one or more of the embodiments) may be omitted, or some of the components may be combined.

The invention claimed is:

1. A route restriction member for a wire harness for accommodating an electrical wire and restricting a route of the electrical wire, the route restriction member comprising:
    a tube in which the electrical wire is accommodated, the tube including:
        a first member made of metal;
        a second member made of metal that is abutted against the first member to form the tube, the first member and the second member being a pair of half bodies; and
        a pair of fitting recesses provided in abutments of the pair of half bodies, the fitting recesses being adjacent to each other in a circumferential direction of the pair of half bodies and forming a fitting hole; and
    a fastening band that fastens an outer periphery of the tube, the fastening band including:
        a band body having a first end and a second end;
        an engaging portion disposed at the first end of the fastening band, the engaging portion including an insertion hole through which the band body is inserted; and
        a fitting protrusion that fits in the fitting hole is provided on an inner peripheral surface of the fastening band between the first end and the second end of the fastening band, the fitting protrusion being different from the engaging portion, and the fitting hole being different from the insertion hole.

2. The route restriction member according to claim 1, wherein a clip is erected on an outer peripheral surface of the fastening band.

3. A wire harness, comprising: the electrical wire including a core wire having an insulating coating thereon; and the route restriction member according to claim 1.

* * * * *